(12) United States Patent
Wu et al.

(10) Patent No.: US 11,491,565 B2
(45) Date of Patent: Nov. 8, 2022

(54) PROBE FORMING DEVICE

(71) Applicant: METAL INDUSTRIES RESEARCH & DEVELOPMENT CENTRE, Kaohsiung (TW)

(72) Inventors: Wen-Chieh Wu, Kaohsiung (TW); Zhi-Wen Fan, Kaohsiung (TW); Chun-Wei Chen, Kaohsiung (TW); Tzu-Hung Chen, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 569 days.

(21) Appl. No.: 16/724,993

(22) Filed: Dec. 23, 2019

(65) Prior Publication Data

US 2021/0187644 A1 Jun. 24, 2021

(51) Int. Cl.
*B23H 5/08* (2006.01)
*B23H 9/08* (2006.01)
*B24B 27/00* (2006.01)

(52) U.S. Cl.
CPC ............... *B23H 5/08* (2013.01); *B23H 9/08* (2013.01); *B24B 27/0076* (2013.01)

(58) Field of Classification Search
CPC ..................... B23H 5/08; B23H 9/08
See application file for complete search history.

(56) References Cited

U.S. PATENT DOCUMENTS 11,173,561 B1 * 11/2021 Chen .................. B23H 9/00
2018/0317959 A1 * 11/2018 Bauer ................ A61M 5/3286

FOREIGN PATENT DOCUMENTS

CN          110125496 A  *  8/2019  ............. B23H 11/00

* cited by examiner

*Primary Examiner* — Nicholas A Smith
(74) *Attorney, Agent, or Firm* — Rosenberg, Klein & Lee

(57) ABSTRACT

The present invention is a probe forming device, the probe forming device comprises a spinning shaft, a first adjusting structure, a second adjusting structure, an electrolyte conveying member and a power supply. One of the holding member of the spinning shaft holds a workpiece, and a driving member drives the workpiece to move and abut the first adjusting structure and the second modulating structure. The electrolyte conveying member conveys an electrolyte to the workpiece, the first adjusting structure and the second adjusting structure, and is electrically connected. At least one positive end of the power supply is connected to the workpiece or the spinning shaft, and at least one negative end is connected to the first adjusting structure and the second modulating structure.

8 Claims, 6 Drawing Sheets

PROBE FORMING DEVICE

FIELD OF THE INVENTION

The present invention relates generally to a forming device, and particularly to probe forming device.

BACKGROUND OF THE INVENTION

The manufacturing apparatus for probes according to the prior art is to drive a grinding wheel to grind a rod material to a probe. Alternatively, a rod material is placed on a laid-flat sandpaper and grinded back and forth. Either way, the consumption of grinding wheels and sandpapers is extremely rapid.

According to the method for manufacturing probes according to the prior art, a rod material is first grinded by the grinding wheel of a grinder or a sandpaper. Then the shape of the probe is examined to check if damages exist. Since the above method adopts manual grinding, depending on the grinding force, angle, and direction by the operator, different grinding results will be produced. In addition, the properties of the rod material, such as hardness and density, also influence the result of forming a probe form a rod material. Thereby, repeated grinding and confirmation are required to ensure the shape of probes. It is the repeated confirmation and grinding makes the manufacturing time long. Besides, the probability of damages is high, which makes the manufacturing time even longer.

Furthermore, as modern technologies develop, the chip size shrinks gradually, urging the size of the probes for testing shrinks accordingly. Thereby, in addition to the manufacturing method according to the prior art, there is also an electrochemical machining (ECM) method to manufacture probes with sizes smaller than 200 µm. The ECM method is to perform machining by electrochemical dissolution using a metal workpiece as the anode. The method is not an electrolysis machining method according to the prior art. It can be applied to machining extremely hard materials, such as tool steel, hard alloy, superalloy, or titanium alloy, or the materials difficult to be processed by the methods according to the prior art. The main requirement of the ECM method is that the object under machining must be conductive. While performing ECM, the cutting tool is the cathode and the object under machining is the anode. Under low-voltage and high-current condition, the electrolyte can circulate rapidly through the electrodes and the object under machining under pressure for electrolysis. The cutting tool moves along the machining path and does not contact the object under machining. No sparks will occur in the process. The object under machining is immersed in the electrolyte and dissolved in the machining process. Then the cutting tool is used to shape the object under machining.

Although the ECM method can manufacture the desired shape of the object under machining rapidly, the electrolysis must be performed under a high pressure. Thereby, expensive instruments and equipment must be invested before the machining method can be performed.

According to the three methods described above, it is known that grinding using grinders or sandpapers takes longer processing time has higher probability of damages. Although the ECM method can manufacture the shape of object under machining rapidly and accurately, the costly machines required make the manufacturing costs expensive.

Accordingly, to solve the endurance problem of grinding wheels and sandpapers as described above, improve the production efficiency for probes, shorten the processing time effectively, and reduce the manufacturing costs by avoiding special instruments and equipment, the present invention adopts an electrolysis method and an improved probe forming device to solve the above problems.

According to the above description, the present invention provides a probe forming device, which uses an angle adjusting member to adjust the angle of probe tip after forming. In addition, negative charges are provided to the workpiece and positive charges are provided to the angle adjusting member. By using the electrolyte, the workpiece and the angle adjusting member connected electrically to form the required shape of probes.

SUMMARY

An objective of the present invention is to provide a probe forming device, which can shorten the forming time, increase the production efficiency, reduce the consumption of grinding members, and process to produce probes rapidly.

To achieve the above objective, the present invention provides a probe forming device, which comprises a spinning shaft, a first adjusting structure, a second adjusting structure, an electrolyte conveying member, and a power supply. The spinning shaft includes a holding member and a driving member. One side of the spinning shaft is connected to the holding member, which holds a workpiece. The driving member drives the spinning shaft to perform single-shaft reciprocating movement. The first adjusting structure is disposed on one side of the workpiece and includes a first angle adjusting member. The first angle adjusting member includes a first grinding member. Furthermore, the first adjusting structure forms a first angle with the holding member. The second adjusting structure is disposed corresponding to the first adjusting structure and on the other side of the workpiece and includes a second angle adjusting member. The second angle adjusting member includes a second grinding member. Furthermore, the second adjusting structure forms a second angle with the holding member. The electrolyte conveying member is disposed between the first adjusting structure and the second adjusting structure and above of the workpiece. The power supply includes one or more positive terminal and one or more negative terminal. The one or more positive terminal is connected to the workpiece or the spinning shaft. The one or more negative terminal is connected to the first adjusting structure and the second adjusting structure.

According to an embodiment of the present invention, the probe forming device further comprises a base. The first adjusting structure and the second adjusting structure are disposed on the base.

According to an embodiment of the present invention, the first angle is equal to the second angle.

According to an embodiment of the present invention, the probe forming device further comprises a first driving motor and a second driving motor disposed below a base. The first driving motor passes through the base and is connected to the first angle adjusting member. The second driving motor passes through the base and is connected to the second angle adjusting member.

According to an embodiment of the present invention, the first angle ranges between 1° and 22.5°.

According to an embodiment of the present invention, the second angle ranges between 1° and 22.5°.

According to an embodiment of the present invention, the spinning shaft further includes a spin driver disposed inside the body of the spinning shaft and connected with the holding member.

According to an embodiment of the present invention, the electrolyte conveying member includes a nozzle and a tube. One side of the tube is connected with the nozzle.

DETAILED DESCRIPTION

In order to make the structure and characteristics as well as the effectiveness of the present invention to be further understood and recognized, the detailed description of the present invention is provided as follows along with embodiments and accompanying figures.

The probe grinding device according to the prior art drives a grinding wheel to grind probe directly or grinds probes back and forth on a flat sandpaper. The consumption of grinding wheels or sandpapers is quite rapid. Thereby, how to reduce the consumption of materials and increase the manufacturing speed are the problems to be solved.

The present invention improves the drawbacks in the processing methods according to the prior art, shortens the processing time, increases the production efficiency, lowers the consumption of grinding members such as grinding wheels and sandpapers, and processes to give the desired probes rapidly. By using the electrolysis method and the angle adjusting devices, the repeated processes and confirmation in the methods according to the prior art are no more required. The desire probe specifications can be manufactured directly.

The detailed description of the present invention is provided as follows along with embodiments and accompanying figures. The concepts of the present invention can be embodied by various forms. Those embodiments are not used to limit the scope and range of the present invention.

Figure 1:
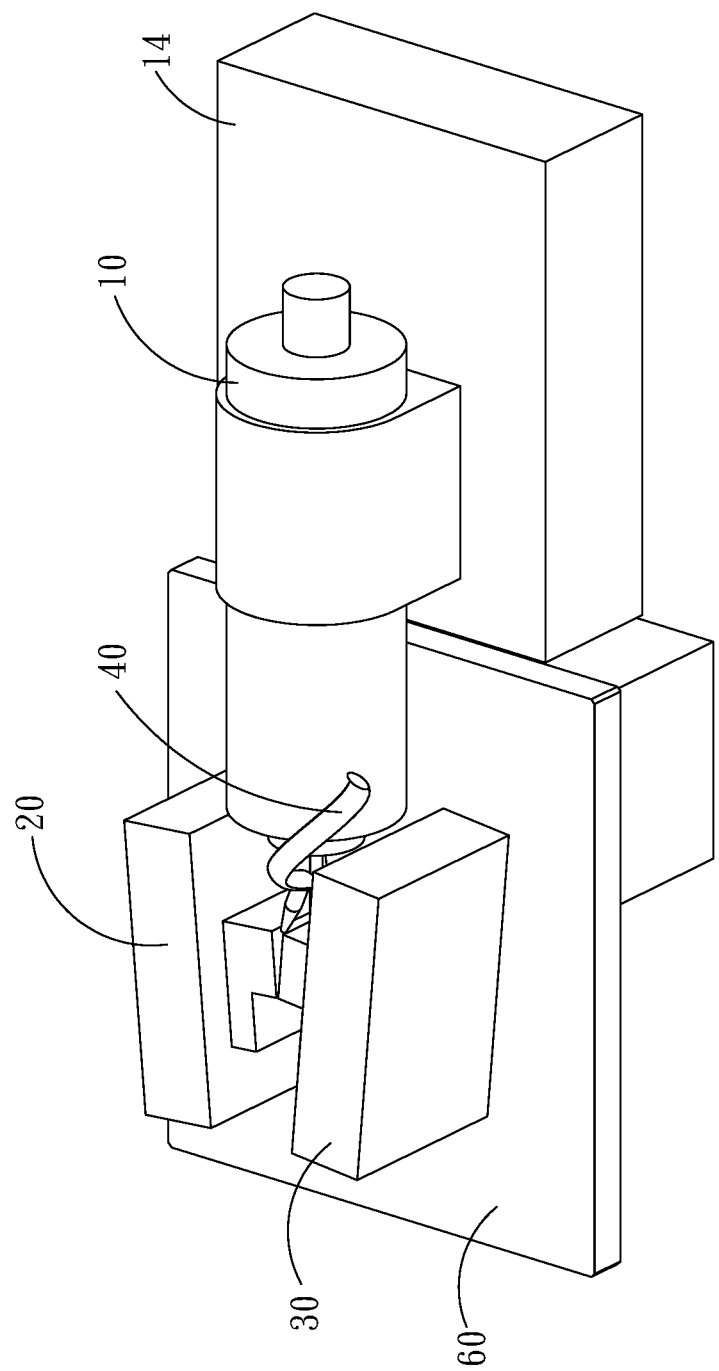
FIG. 1 shows a schematic diagram of the device according to an embodiment of the present invention.

First, please refer to FIG. 1, which shows a schematic diagram of the device according to an embodiment of the present invention. As shown in the Figure, a probe forming device 1 comprises a spinning shaft 10, a first adjusting structure 20, a second adjusting structure 30, an electrolyte conveying member 40, and a base 60.

Figure 2:
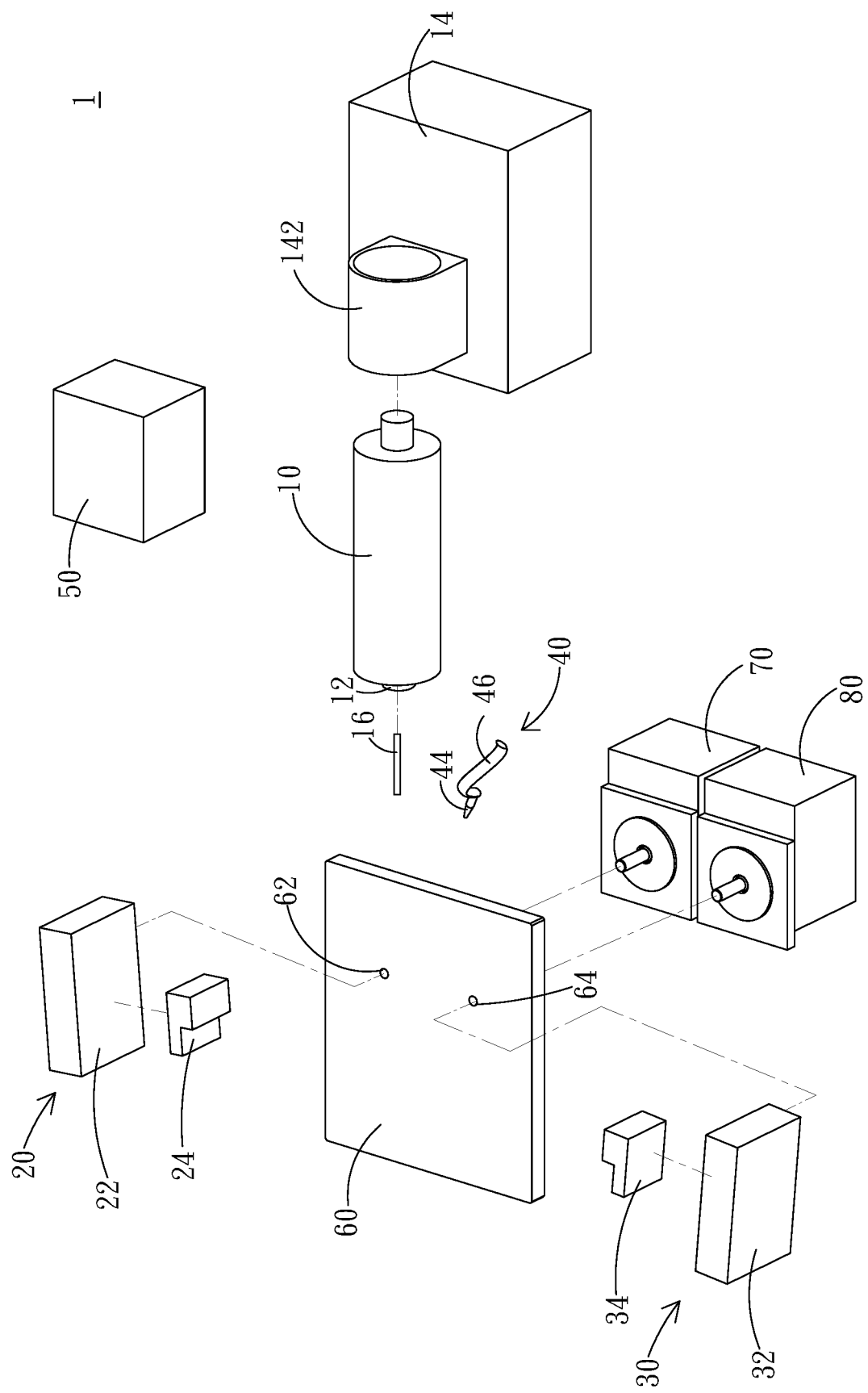
FIG. 2 shows an exploded view of the device according to an embodiment of the present invention.

The probe forming device 1 according to the present invention comprises a spinning shaft 10, a first adjusting structure 20, a second adjusting structure 30, an electrolyte conveying member 40, and a power supply 50. Please refer to FIG. 2, which shows an exploded view of the device according to an embodiment of the present invention. The spinning shaft 10 includes a holding member 12 and a driving member 14. One side of the spinning shaft 10 is connected to the holding member 12. The holding member 12 holds a workpiece 16. The driving member 14 drives the spinning shaft 10 to perform reciprocating movement. In addition, the spinning shaft 10 is fixed to the driving member 14. According to an embodiment of the present invention, a fixing base 142 is used to fix the spinning shaft 10. Nonetheless, the present invention is not limited to the embodiment. Besides, the spinning shaft 10 further includes a spin driver 18 disposed inside the body of the spinning shaft 10 and connected with the holding member 12. Then the spin driver 18 can drive the holding member 12 to spin.

Figure 3:
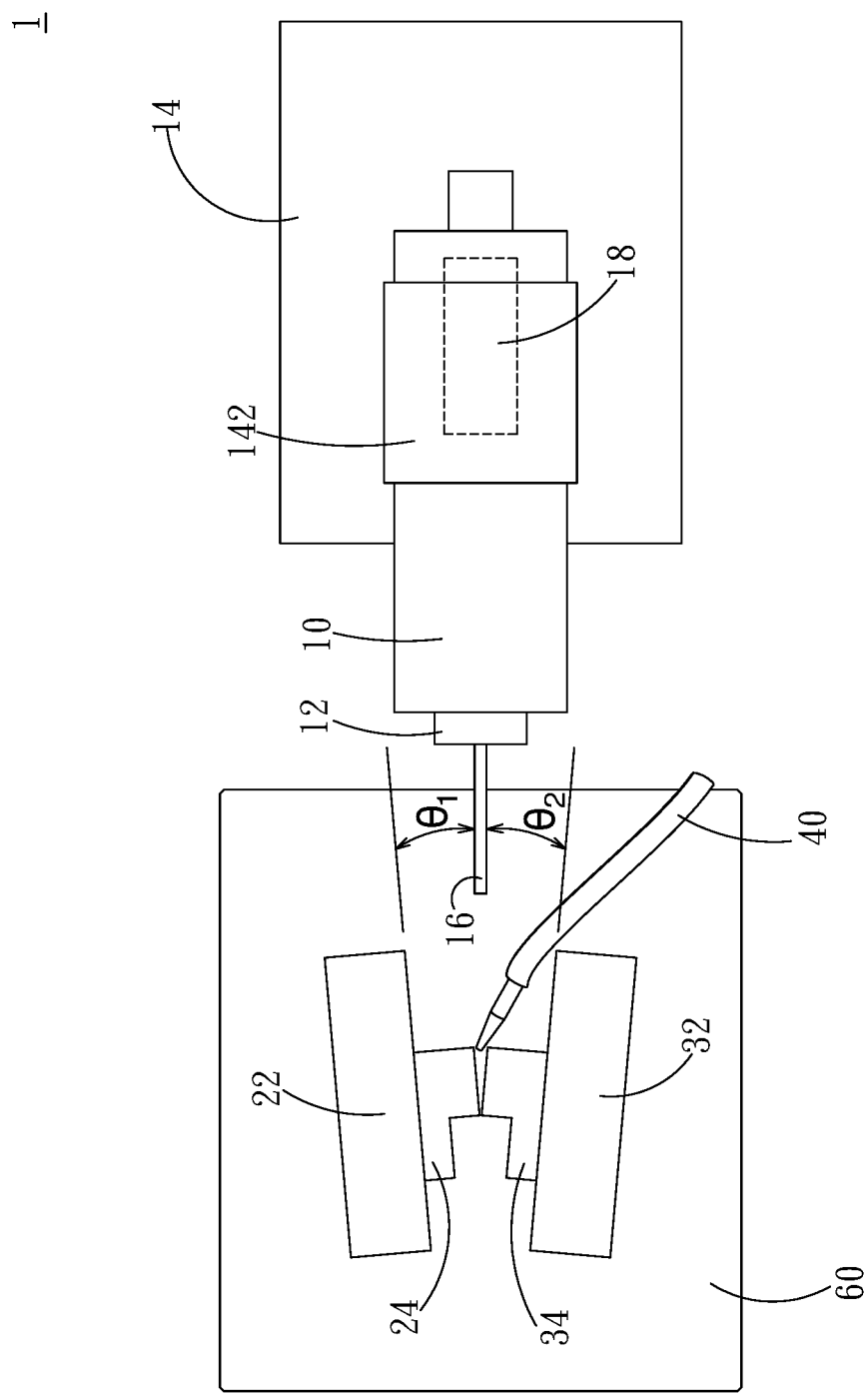
FIG. 3 shows a top view of the device according to an embodiment of the present invention.

In addition, the first adjusting structure 20 and the second adjusting structure 30 are disposed on a base 60 and on both sides of the workpiece 16 opposing to each other, respectively. It means that the first adjusting structure 20 and the second adjusting structure 30 are opposing to each other with the workpiece 16 located at the center. The first adjusting structure 20 includes a first angle adjusting member 22, which includes a first grinding member 24. Furthermore, the first adjusting structure 20 forms a first angle $\theta_1$ with the holding member 12. Moreover, the second adjusting structure 30 includes a second angle adjusting member 32, which includes a second grinding member 34. Furthermore, please refer to FIG. 3, which shows a top view of the device according to an embodiment of the present invention. As shown in the figure, the second adjusting structure 30 forms a second angle $\theta_2$ with the holding member 12. The first angle $\theta_1$ and the second angle $\theta_2$ can be identical angles.

The first adjusting structure 20 and the second adjusting structure 30 are driven by a first driving motor 70 and a second driving motor 80, which are disposed below a base 60. Furthermore, the first driving motor 70 passes through a first hole 62 of the base 62 and is connected to the first angle adjusting member 22; the second driving motor 80 passes through a second hole 64 of the base 62 and is connected to the second angle adjusting member 32. The first driving motor 70 and the second driving motor 80 are, but not limited to, stepper motors.

Besides, the electrolyte conveying member 40 is disposed between the first adjusting structure 20 and the second adjusting structure 30 and above the workpiece 16. The electrolyte conveying member 40 is used for transporting an electrolyte 42 and includes a nozzle 44, a tube 46, and an electrolyte container (not shown in the figure). One side of the tube 46 is connected to the nozzle 44 while the other side thereof is connected to a pump device (not shown in the figure). The pump device is disposed inside the electrolyte container. The electrolyte conveying member 40 uses the pump device to pump the electrolyte 42.

Next, a power supply 50 includes one or more positive terminal 52 and one or more negative terminal 54. The one or more positive terminal 52 is connected to the workpiece 16 or the spinning shaft 10. The one or more negative terminal 54 is connected to the first adjusting structure 20 and the second adjusting structure 30. The electrolyte 42 flows through the workpiece 16, the first adjusting structure 20, and the second adjusting structure 30 and connects electrically to produce an electrolysis procedure.

The probe forming device 1 according to the present invention improves traditional manual fabrication of probes using grinders or sandpapers. The manual method is time-consuming and laborious. A minor false operation might lead to scrapping of probes. The one or more negative terminal 54 is connected to the first adjusting structure 20 and the second adjusting structure 30. The one or more positive terminal 52 is connected to the workpiece 16. The electrolyte 42 enables the workpiece 16, the first adjusting structure 20, and the second adjusting structure 30 to conduct electrically and starts the electrolysis procedure. By using the electrolysis procedure, the probe specifications can be manufactured rapidly.

Figure 4A:
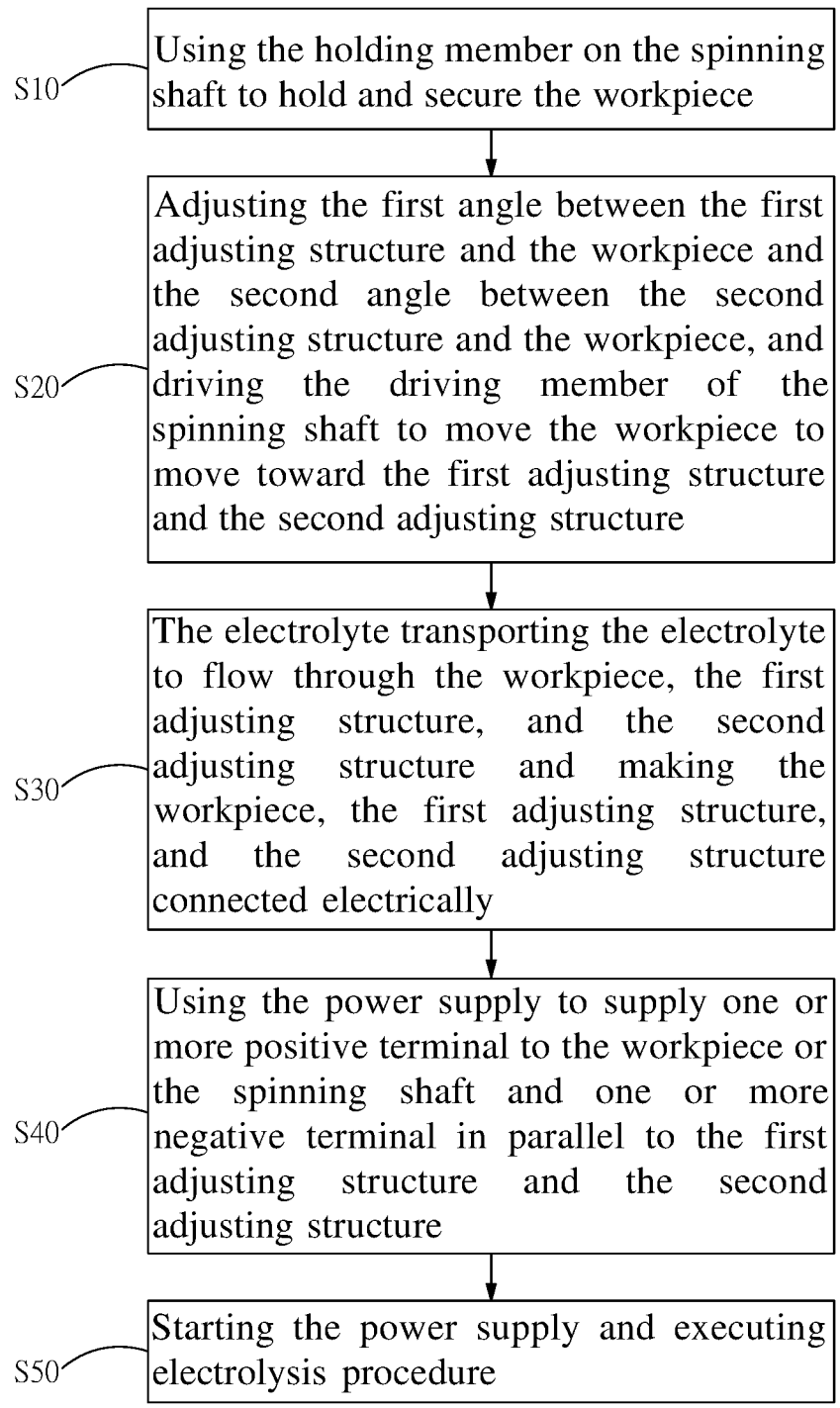
FIG. 4A shows a flowchart for using the device according to an embodiment of the present invention.

In addition, the process flow of the probe forming device 1 according to the present invention is illustrated in FIG. 4A, which shows a flowchart for using the device according to an embodiment of the present invention. As shown in the figure, the process flow comprises the following steps:

Step S10: Using the holding member on the spinning shaft to hold and secure the workpiece;

Step S20: Adjusting the first angle between the first adjusting structure and the workpiece and the second angle between the second adjusting structure and the workpiece, and driving the driving member of the spinning shaft to move the workpiece to move toward the first adjusting structure and the second adjusting structure;

Step S30: The electrolyte transporting the electrolyte to flow through the workpiece, the first adjusting structure, and the second adjusting structure and making the workpiece, the first adjusting structure, and the second adjusting structure connected electrically;

Step S40: Using the power supply to supply one or more positive terminal to the workpiece or the spinning shaft and one or more negative terminal in parallel to the first adjusting structure and the second adjusting structure; and Step S50: Starting the power supply and executing electrolysis procedure.

The steps for using the device according to the present invention include the steps S10 to S50. As shown in the steps, the workpiece 16 is held by the holding member 12 of the spinning shaft 10. Adjust the first adjusting structure 20 to form a first angle $\theta_1$ with the holding member 12; and adjust the second adjusting structure 30 to form a second angle $\theta_2$ with the holding member 12. In addition, drive the spinning shaft 10 to move toward the first adjusting structure 20 and the second adjusting structure 30. Then, use the electrolyte conveying member 40 to transport the electrolyte 42, which flows through the workpiece 16, the first adjusting structure 20, and the second adjusting structure 30, making them electrically connected. Meanwhile, start the power supply 50 to supply the one or more positive terminal 52 to the workpiece 16 or the spinning shaft 10 and the one or more negative terminal 54 to the first adjusting structure 20 and the second adjusting structure 30 for starting an electrolysis procedure to fabricate the required probes.

Figure 4B:
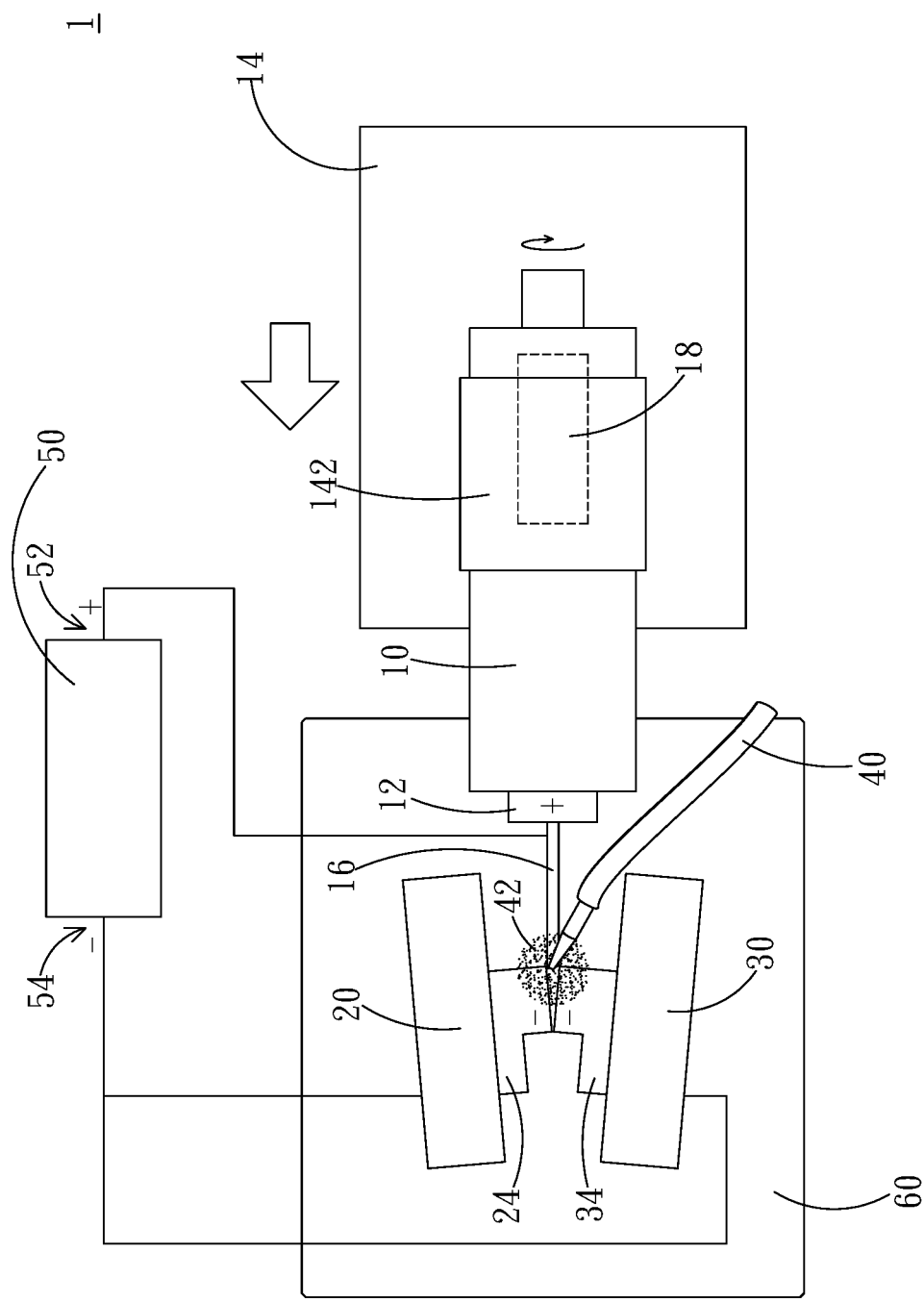
FIG. 4B and FIG. 4C show schematic diagrams of the processing status of the device according to an embodiment of the present invention.
Figure 4C:
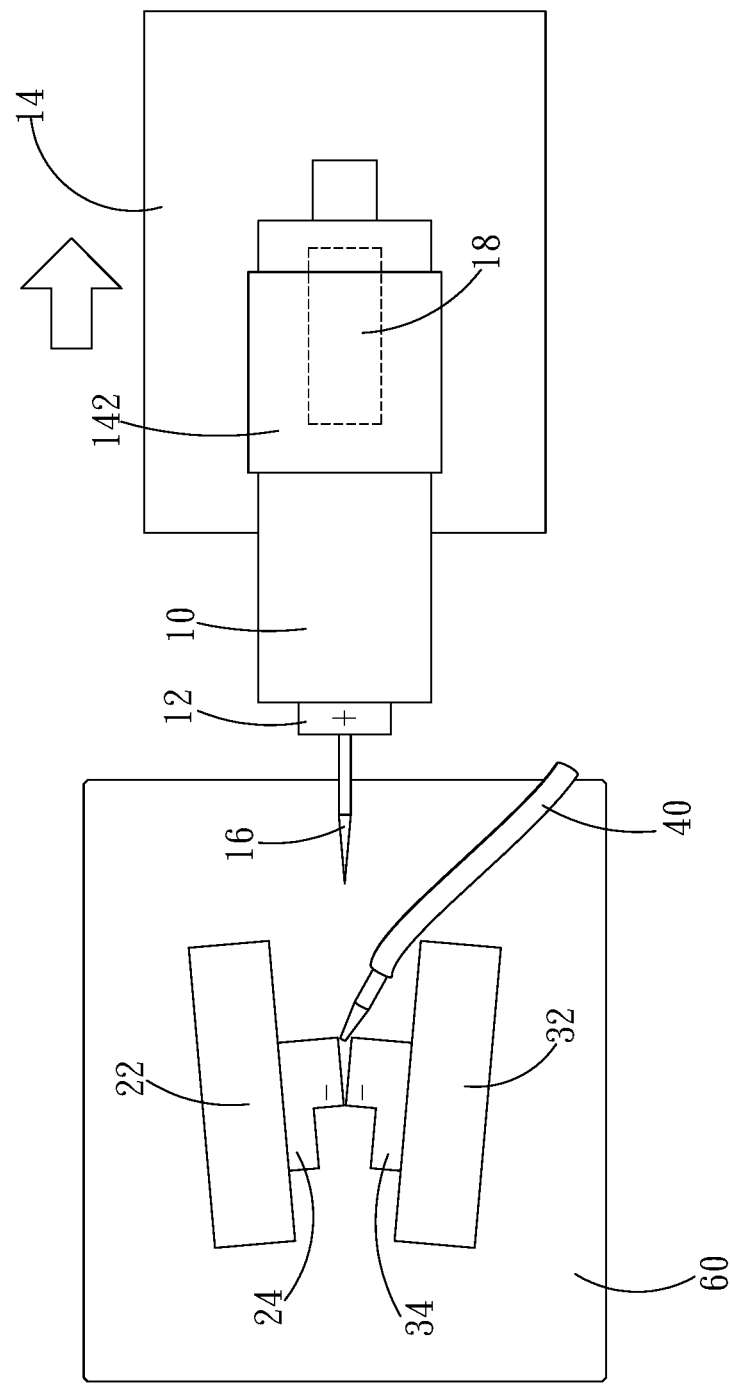

To describe the steps of using the probe forming device 1 according to the present invention more clearly, an embodiment will be used as an example. Please refer to FIG. 4B and FIG. 4C, which show schematic diagrams of the forming status of the device according to an embodiment of the present invention. As shown in the figures, the rod material to be grinded (namely, the workpiece 16) is held to spinning shaft 10 and the spinning shaft 10 is installed to the driving member 14. The first adjusting structure 20 and the second adjusting structure 30 are disposed symmetrical to the rod material to be grinded. Besides, the first grinding member 24 and the second grinding member 34 are disposed symmetrically as well. The first adjusting structure 20 and the second adjusting structure 30 are disposed on the first driving motor 70 and the second driving motor 80. The first driving motor 70 and the second driving motor 80 drive the first adjusting structure 20 and the second adjusting structure 30 to spin. In addition, the one or more positive terminal 52 of the power supply 50 is connected to the rod material to be grinded; the one or more negative terminal 54 of the power supply 50 is connected to the first adjusting structure 20 and the second adjusting structure 30.

Next, according to the angle to form the probe, the first driving motor 70 and the second driving motor 80 are driven to change the angles of the first adjusting structure 20 and the second adjusting structure 30. After the first grinding member 24 and the second driving member 34 are driven to appropriate angles, the power supply 50 is started to supply the power for the electrolysis procedure. In addition, the spinning shaft 10 is started to spin by the spin driver 18 and hence driving the rod material to be grinded to spin accordingly. Control the driving member 14 to move toward the gap of the angle between the first grinding member 24 and the second grinding member 34. Besides, use the electrolyte conveying member 40 to transport the electrolyte 42 to the rod to be grinded, the first grinding member 24, and the second grinding member 34 for performing the electrolysis procedure. After the rod to be grinded is shaped to the desired length for the probe, the driving member 14 can withdraw from the gap of the angle between the first grinding member 24 and the second grinding member 34. Afterwards, the power supply 50 is shut off and the fabrication of probes is completed.

The one or more negative terminal 54 according to the present invention can be disposed in parallel or in series electrically with the first adjusting structure 20 and the second adjusting structure 30. According to the above embodiment, parallel connection of the one or more negative terminal 54 is adopted as an example. Nonetheless, the present invention is not limited to the embodiment.

The probe forming device 1 according to the present invention matches the angular requirement of the workpiece 16 by adjusting the angle between the first grinding member 24 and the second grinding member 34. In addition, the electrolysis procedure is applied to reduce the hardness of the workpiece 16 as well as lower the consumption of the first grinding member 24 and the second grinding member 34. According to the present invention, no special design of the geometric shapes of the first grinding member 24 and the second grinding member 34 is required for manufacturing probes. Instead, the requirement in angle can be achieved by using the first adjusting structure 20 and the second adjusting structure 30. Moreover, the control on the electric field in the probe forming device 1 according to the present invention is easier than in the ECM.

The present invention provides a probe forming device which can shorten the processing time, increase the production efficiency, reduce the consumption of grinding members, and process to produce probes rapidly. The probe forming device uses an angle adjusting member to adjust the angle of probe tip after forming. In addition, negative charges are provided to the workpiece and positive charges are provided to the angle adjusting member. By using the electrolyte, the workpiece and the angle adjusting member connected electrically to form the required shape of probes.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A probe forming device, comprising:
    a spinning shaft, including a holding member and a driving member, having one side connected to said holding member, wherein said holding member holds a workpiece, and said driving member drives said spinning shaft to perform single-axis reciprocating movement;
    a first adjusting structure, disposed on one side of said workpiece, including a first angle adjusting member, wherein said first angle adjusting member includes a first grinding member, and said first adjusting structure forms a first angle with said holding member;

a second adjusting structure, disposed on the other side of said workpiece opposing to said first adjusting structure, including a second angle adjusting member, wherein said second angle adjusting member includes a second grinding member, and said second adjusting structure forms a second angle with said holding member;

an electrolyte conveying member, disposed between said first adjusting structure and said second adjusting structure and above said workpiece; and a power supply, including one or more positive terminal and one or more negative terminal, wherein said one or more positive terminal is connected to said workpiece or said spinning shaft, and said one or more negative terminal is connected to said first adjusting structure and said second adjusting structure.

2. The probe forming device of claim 1, and further comprising a base, wherein said first adjusting structure and said second adjusting structure are disposed on said base.

3. The probe forming device of claim 1, wherein said first angle is equal to said second angle.

4. The probe forming device of claim 1, and further comprising a first driving motor and a second driving motor disposed below a base, said first driving motor passing through a first hole of said base and connected to said first angle adjusting member, and said second driving motor passing through a second hole of said base and connected to said second angle adjusting member.

5. The probe forming device of claim 1, wherein said first angle ranges between 1° and 22.5°.

6. The probe forming device of claim 1, wherein said second angle ranges between 1° and 22.5°.

7. The probe forming device of claim 1, wherein said spinning shaft further includes a spin driver, disposed inside the body of said spinning shaft and connected to said hold member.

8. The probe forming device of claim 1, wherein said electrolyte conveying member includes:

a nozzle; and a tube, with one side connected to said nozzle.

* * * * *